US006961673B2

(12) United States Patent
Barnes (10) Patent No.: US 6,961,673 B2
(45) Date of Patent: Nov. 1, 2005

(54) MEASURING DISCONTINUITY IN SEISMIC DATA

(75) Inventor: Arthur E. Barnes, Centennial, CO (US)

(73) Assignee: Landmark Graphics Corporation, Houston, TX (US)

(*) Notice: Subject to any disclaimer, the term of this patent is extended or adjusted under 35 U.S.C. 154(b) by 118 days.

(21) Appl. No.: 10/608,734

(22) Filed: Jun. 27, 2003

(65) Prior Publication Data

US 2004/0267499 A1 Dec. 30, 2004

(51) Int. Cl.⁷ ............................................. G06F 11/30
(52) U.S. Cl. ..................................................... 702/182
(58) Field of Search ........................... 702/182, 17, 14; 367/19, 23, 37, 36, 75, 56, 22, 60, 144; 364/21; 181/106, 118

(56) References Cited

U.S. PATENT DOCUMENTS

| | | | |
|---|---|---|---|
| 4,204,279 A | 5/1980 | Parrack et al. | 367/40 |
| 4,207,619 A | * 6/1980 | Klaveness | 367/36 |
| 4,403,313 A | 9/1983 | Garotta | 367/61 |
| 4,528,649 A | * 7/1985 | Gassaway et al. | 367/36 |
| 4,633,402 A | 12/1986 | Flinchbaugh | 364/421 |
| 4,984,220 A | 1/1991 | Bodine et al. | 367/68 |
| 5,008,861 A | 4/1991 | Gallagher | 367/59 |
| 5,563,949 A | 10/1996 | Bahorich et al. | 364/421 |
| 5,838,564 A | 11/1998 | Bahorich et al. | 364/421 |
| 5,930,730 A | 7/1999 | Marfurt et al. | 702/16 |
| 5,940,778 A | 8/1999 | Marfurt et al. | 702/16 |
| 6,092,026 A | 7/2000 | Bahorich et al. | 702/16 |

OTHER PUBLICATIONS

Article entitled "Semblance and Other Coherency Measures For Multichannel Data," by N.S. Neidell and M. Turhan Taner, Geophysics, vol. 36, Issue 3, pp. 482–497, Jun. 1971.

Printout from website regarding the article entitled "PO65 Coherence Calculation of Different Seismic Attribute Traces for Fault Interpretation," by P. Scholtz, EAGE 58th Conference and Technical Exhibition—Amsterdam, Jun. 3–7, 1996.

Printout from website regarding the article entitled "3–D Seismic Attributes Using a Semblance–based Coherency Algorithm," by K.J. Marfut et al., Geophysics, vol. 63, Issue 4, pp. 1150–1165, Jul.–Aug. 1998.

Cohen, I., and Coifman, L.C., 2002, Local discontinuity measure for 3–D seismic data: Geophysics, vol. 67, pp. 1933–1945.

Chopra, S., 2001, Integrating coherence cube imaging and seismic attributes: Recorder, vol. 26, No. 12, pp. 20–22.

Celis, V. and Larner, K., 2002, Selective–correlation velocity analysis, 72nd Ann. Internat. Mtg: Soc. of Expl. Geophys., pp. 2289–2292.

* cited by examiner

*Primary Examiner*—Bryan Bui
*Assistant Examiner*—Tung Lau
(74) *Attorney, Agent, or Firm*—Conley Rose, P.C.

(57) ABSTRACT

Various methods for measuring continuity and discontinuity of a seismic data set. One method embodiment includes: a) detecting seismic energy with an array of detectors; b) converting detection signals from the array of detectors into data representing one or more attributes as a function of position for subsurface formations; c) systematically obtaining subsets of the data as vector sets; and d) for each vector set: (1) combining vectors from the vector set to determine a representative vector for the vector set; and (2) calculating a continuity or discontinuity measurement with respect to the representative vector. In various embodiments, the continuity or discontinuity measurement may be expressible as a fraction of vector set energy derived from vector components aligned with or deviating from the representative vector.

21 Claims, 3 Drawing Sheets

MEASURING DISCONTINUITY IN SEISMIC DATA

BACKGROUND

Petroleum companies frequently use seismic surveys in their search for exploitable petroleum reservoirs. A seismic survey is an attempt to map the subsurface of the earth by sending sound energy down into the ground and recording the "echoes" that return from the rock layers below. The source of the down-going sound energy might come from explosions or seismic vibrators on land, and air guns in marine environments. During a seismic survey, the energy source is moved across the surface of the earth above the geologic structure of interest. Each time the source is triggered, it generates a seismic signal that travels downward through the earth and is partially reflected from boundaries between different rock types. These reflections cause sound energy waves to return toward the surface where they are detected by a set of spaced geophones or seismic energy detectors. The detectors generate electrical signals representative of the sound energy arriving at their locations.

The acoustic energy detected by the seismic detectors is generally amplified and then recorded or stored in either analog or digital form on some record medium. The recording is made as a function of time after the triggering of the source. The recorded data may be transported to a computer and displayed in the form of traces, i.e., plots of the amplitude of the reflected seismic energy as a function of time for each of the geophones or seismic energy detectors. Such displays or data may be processed to simplify the interpretation of the arriving acoustic energy at each seismic detector in terms of the subsurface layering of the earth's structure. Data from multiple explosion/recording location combinations may be combined to create a nearly continuous profile of the subsurface that may extend for many miles.

Survey types are often distinguished in terms of the pattern of recording locations on the earth's surface. As viewed from above, the recording locations may be laid out in a straight line, in which case the result is a two-dimensional (2-D) seismic survey. A 2-D survey can be thought of as a cross-sectional view (a vertical slice) of the earth formations lying underneath the line of recording locations. Alternatively, the recording locations may be laid out in a two-dimensional array pattern on the surface, in which case the result is a three-dimensional (3-D) seismic survey. A 3-D survey produces a data "cube" or volume that is, at least conceptually, a 3-D picture of the subsurface that lies beneath the survey area.

A seismic survey is composed of a very large number of individual seismic recordings or traces. In a typical 2-D survey, there will usually be several tens of thousands of traces, whereas in a 3-D survey the number of individual traces may run into the multiple millions of traces. In the past, the traces were recorded in analog form, but modem seismic traces are generally recorded in digital form. The digital samples are usually acquired at 0.004 second (4 millisecond or "ms") intervals, although 2 millisecond and 1 millisecond sampling intervals are also common. Thus, each digital sample in a seismic trace is associated with a travel time (in the case of reflected energy a two-way travel time from the surface to the reflector and back to the surface again). Further, the surface position of every trace in a seismic survey is carefully recorded and is generally made a part of the trace itself (as part of the trace header information). This allows the seismic information contained within the traces to be later correlated with specific subsurface locations, thereby providing a means for posting and contouring seismic data, and attributes extracted therefrom, on a map (i.e., "mapping"). General information pertaining to 3-D data acquisition and processing may be found in Chapter 6, pages 384–427, of Seismic Data Processing by Ozdogan Yilmaz, Society of Exploration Geophysicists, 1987, the disclosure of which is incorporated herein by reference.

The data volume in a 3-D survey is amenable to viewing in a number of different ways. First, horizontal "constant time slices" may be extracted from the seismic volume by collecting all digital samples that occur at the same travel time. This operation results in a 2-D plane of seismic data. By animating a series of 2-D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2-D seismic line from within the 3-D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, nonconformities, and sub-surface salt domes and reefs, among many others. During the computer processing of seismic data, estimates of subsurface velocity are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences. This correlation can be applied to seismic data collected over new exploration targets. In brief, seismic data provides some of the best subsurface structural and stratigraphic information that is available, short of drilling a well.

That being said, one of the most challenging tasks facing the seismic interpreter—one of the individuals within an oil company that is responsible for reviewing and analyzing the collected seismic data—is locating these stratigraphic and structural features of interest within a potentially enormous seismic volume. By way of example only, it is often important to know the location of discontinuities in a seismic survey.

Discontinuities are sudden changes in the seismic data, and may be indicative of faults and other interesting interruptions in formation geometry. Discontinuity and continuity may be considered opposite ends of a continuity spectrum, so that a high continuity measurement is indicative of a low discontinuity, and conversely, a high discontinuity measurement is indicative of a low continuity.

Faults are particularly significant geological features in petroleum exploration for a number of reasons including the following: 1) they are often associated with the formation of subsurface traps in which petroleum might accumulate, and 2) they can affect (either positively or negatively) production of nearby wells. Given the enormous amount of data collected in a 3-D volume, automated methods of enhancing the appearance of such subsurface features are sorely needed.

Others have suggested methods for enhancing the appearance of discontinuities in seismic data. See, for example, Bahorich et al., U.S. Pat. No. 5,563,949, Gersztenkorn, U.S. Pat. No. 5,892,732, and Marfurt et al., U.S. Pat. No. 5,940,778. Such methods have given inadequate results or have proven suitable only for use on zero-mean data. A more versatile discontinuity measurement method that provides high-quality results would prove commercially advantageous.

SUMMARY

Accordingly, there is disclosed herein various methods of measuring continuity or discontinuity of a seismic data set. One method embodiment comprises: a) detecting seismic energy with an array of detectors; b) converting detection signals from the array of detectors into data representing one or more attributes as a function of position for subsurface formations; c) systematically obtaining subsets of the data as vector sets; and d) for each vector set: (1) combining vectors from the vector set to determine a representative vector for the vector set; and (2) calculating a continuity or discontinuity measurement with respect to the representative vector. In various embodiments, the continuity or discontinuity measurement may be expressible as a fraction of vector set energy derived from those vector components that align with or deviate from the representative vector.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
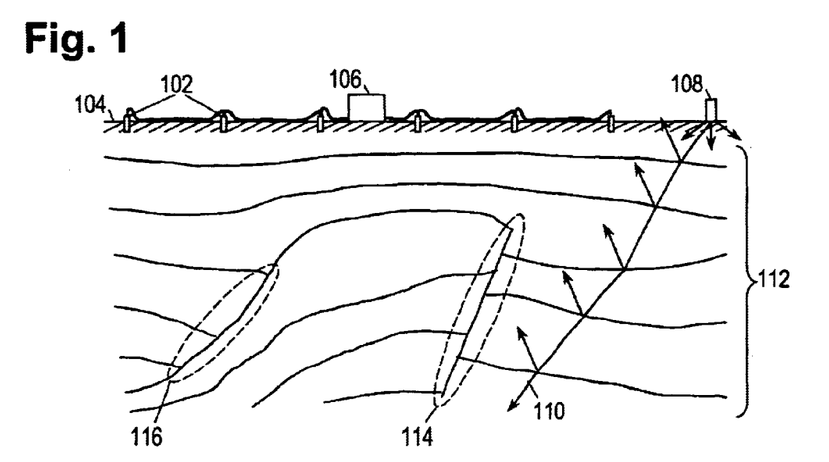
FIG. 1 shows an exemplary environment for obtaining a seismic survey.

Disclosed herein are systems and methods for measuring continuity and discontinuity in seismic data. Seismic data is derived from seismic surveys, which may be obtained as shown in FIG. 1. FIG. 1 shows a set of seismic energy detectors 102 positioned in a spaced-apart arrangement on the earth's surface 104. The detectors 102 are coupled to a recording unit 106 that records the data collected by the detectors. A seismic energy source 108 is triggered to generate sound waves that propagate into the earth as shown by the arrows emanating from source 108. One of the arrows 110 has been extended into the earth to show the path of a particular portion of the sound waves. At each boundary between differently composed layers 112 of the earth, the sound wave is partly reflected and partly refracted (transmitted) as shown. The detectors 102 receive the reflected seismic waves and convert them into electrical signals for storage by recording unit 106.

The source 108 may be repeatedly triggered at different locations relative to the array of detectors 102. The traces from multiple firings may be recorded separately and later combined to screen out random noise and undesirable interference caused by secondary echoes of reflected waves. The data may then be processed to identify the features of the subsurface layers 112. Features of particular interest may include faults (e.g., fault 114) and other sudden changes (e.g., layer termination 116) in the layers.

Figures 2, 3:
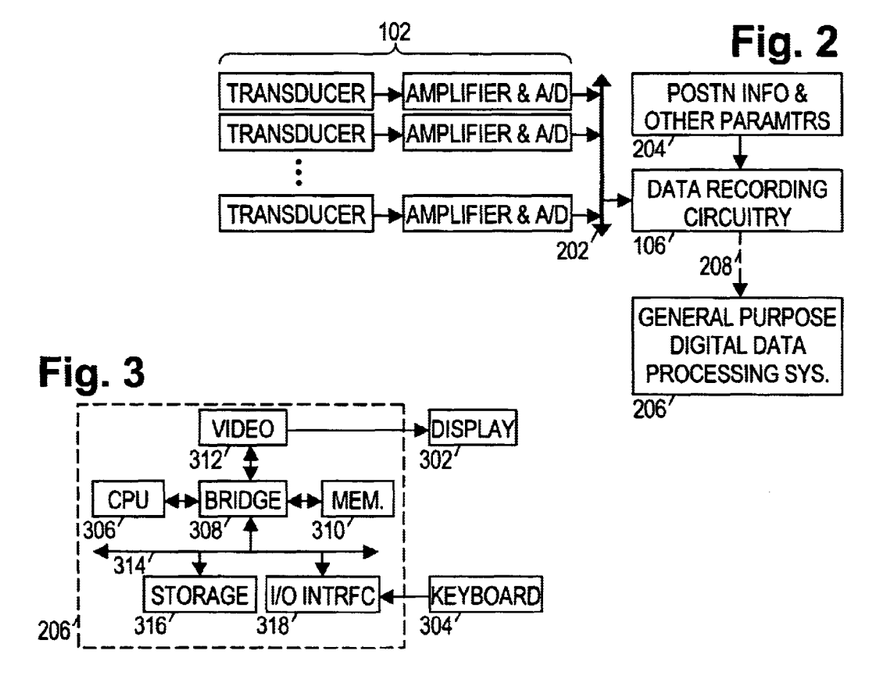
FIG. 2 shows a block diagram of an exemplary seismic surveying system.
FIG. 3 shows a block diagram of exemplary digital equipment for processing and displaying seismic data.

FIG. 2 shows an exemplary block diagram of seismic survey system electronics. The detectors 102 include transducers to convert the seismic wave energy into electric signals, and may further include electronics to filter, amplify, and convert the electric signals into digital data. The digital data may be communicated to the recording unit 106 via a bus 202, or alternatively may be communicated via a dedicated information pathway or via a wireless connection. The recording unit 106 stores the digital data on a information storage medium, along with position information for each of the detectors and any other parameters that may be useful in interpreting the stored data. The location information and other parameters may be provided via an independent interface 204 such as a user interface that allows manual entry of such information.

Recording unit 106 may use any suitable information storage medium. Due to the large volume of information to be stored, the information storage medium is generally some form of magnetic medium, e.g., disk drives or magnetic tape. However it is expected that the necessary storage capacity may also be provided by optical media or integrated circuit memories, though the associated cost may be somewhat higher. In an alternative embodiment, recording unit 106 simply gathers the data from the detectors and transmits the data in real time to a remote location such as a central storage facility.

The data collected by recording unit 106 may be communicated to a general purpose digital data processing system 206. The communication may take place in any of various ways, including transmission via a wired or wireless communications link, and by physical transport of an information storage medium. System 206 may process the traces to combine information from multiple firings and to apply corrections to the traces for such effects as wave propagation delays. Resampling of the data may be performed to obtain evenly-spaced, time or depth-synchronized samples on each of the traces, and to obtain estimated traces at interpolated positions within the detector array. The trace data may also be converted into any number of seismic attribute measurements including without limitation phase, peak amplitude, sound velocity, acoustic impedance, rock porosity, water saturation, and hydrocarbon content.

FIG. 3 shows a block diagram of an exemplary digital data processing system 206. To interact with a user, system 206 may be coupled to a text or graphical display 302, and to an input device 304. Display 302 and input device 304 may together operate as an interface between the user and system 206. That is, system 206 may perform certain actions prompted by user actuation of input device 304 and provide the user with a response via display 302.

System 206 may include a central processing unit (CPU) 306 that is coupled by a bridge 308 to a system memory 310. CPU 306 may also be coupled by bridge 308 to a video card 312 that in turn couples to display 302. CPU 306 may be further coupled by bridge 308 to an expansion bus 314. Also coupled to the expansion bus 314 may be a storage device 316 and an input/output interface 318. Input device 304 may be coupled to system 206 via input/output interface 318.

CPU 306 may operate in accordance with software stored in Memory 310 and/or storage device 316. Under the direction of the software, the CPU 306 may accept commands from an operator via a keyboard or some alternative input device 304, and may display desired information to the operator via display 302 or some alternative output device. CPU 306 may control the operations of other system components to retrieve, transfer, process, and store data.

Bridge 308 coordinates the flow of data between components. Bridge 308 may provide dedicated, high-bandwidth, point-to-point buses for CPU 306, memory 310, and video card 312. In systems having alternative architectures, the bridge 308 may be omitted and the communications between the CPU 306 and all the other system components may occur via bus 314.

Memory 310 may store software and data for rapid access. On the other hand, storage device 316 may store software and data for long-term preservation. Storage device 316 may be portable, may accept removable media, may be an installed component, or may be a integrated component on a main system circuit board. Storage device 316 may also be a removable memory device such as a memory card. In addition, alternatives for storage device 316 may include a nonvolatile integrated memory, a magnetic media storage device, an optical media storage device, or some other form of long-term information storage.

Video card 312 may provide customized processing for graphics, along with data conversion from a memory-based format to a signal format suitable for display 302. Display 302 may provide data in a visual format for use by an operator. For example, display 302 may show a two dimensional map of formation continuity or discontinuity such as that described below with reference to FIG. 6. Alternatively, display 302 may show a three dimensional volume of continuity or discontinuity measurements, by providing a perspective view and/or by animating a two-dimensional image to illustrate data variation as a function of position.

Expansion bus 314 may support communications between bridge 308 and multiple other computer components. Bus 314 may couple to removable modular components and/or components integrated onto a circuit board with bridge 308 (e.g., audio cards, network interfaces, data acquisition modules, modems). In systems that include a network interface, the CPU 306 may access software and data via a network, thereby making it possible for system 206 to use information storage and processing resources external to system 206.

Input/output interface 318 may support communications with legacy components and devices not requiring a high-bandwidth connection. Interface 318 is coupled to input device 304, which may provide data to interface 318 in response to operator actuation. Input device 304 may be a keyboard or some other input device (e.g., pointing devices, buttons, sensors). Multiple input devices may be concurrently coupled to input/output interface 318 to provide data in response to operator actuation. Output devices (e.g., parallel ports, serial ports, printers, speakers, lights) may also be coupled to input/output interface 318 to communicate information to the operator.

In the current context, system 206 may be configured with software that processes seismic data to measure discontinuities. The software may be stored in storage device 316, and some or all of the software may be copied into memory 310 as needed for use by CPU 306. CPU 306 may retrieve the software instructions a few at a time from memory 310, and follow the procedures laid out by the software instructions to achieve the desired measurements of discontinuity in seismic data. These procedures may include opportunities for interaction with a user of system 206, such as displaying fields that allow a user to identify the seismic data file to be operated on, or displaying controls that allow a user to alter processing parameters and change display characteristics.

Figure 4:
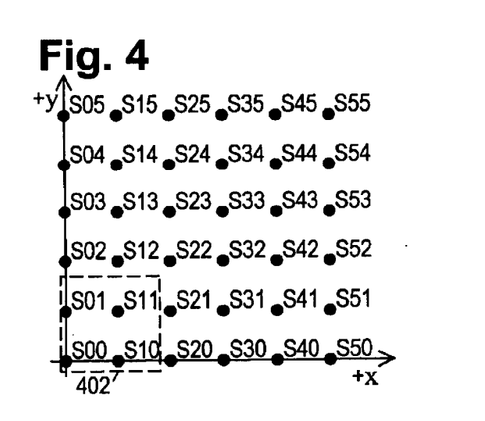
FIG. 4 shows an exemplary layout of seismic energy detectors as seen from above.
Figure 5:
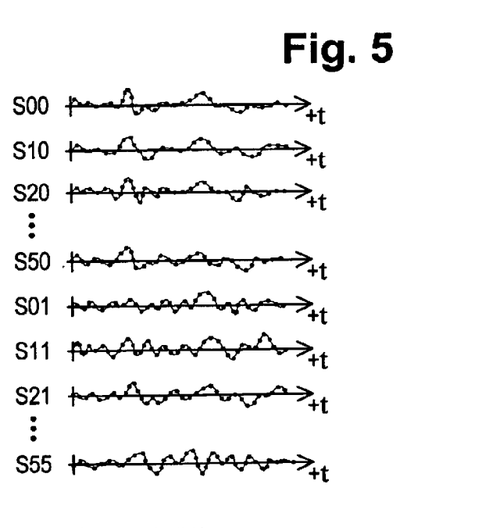
FIG. 5 shows examples of traces recorded by the seismic energy detectors of FIG. 4.

FIGS. 4 and 5 taken together illustrate one form of seismic data that may be processed in accordance with the procedures disclosed herein. FIG. 4 shows an exemplary arrangement of seismic detectors as the arrangement might appear from above. The arrangement in FIG. 4 has 36 detectors distributed in an evenly-spaced 6×6 grid and labeled Sxy, where x is the coordinate along the x axis and y is the coordinate along the y axis. The exemplary arrangement is small and well-ordered solely to aid in understanding the procedures explained below. While an evenly spaced grid arrangement may provide advantages in terms of the resolution and ease of data processing, the disclosed procedures have no inherent requirement for such a regular arrangement.

FIG. 5 shows data traces associated with each of the seismic detectors of FIG. 4. These data traces are shown as a function of time, but could also be provided as a function of depth. The data traces are shown as continuous curves, but are preferably provided as a sequence of digital samples as indicated by the dots on the curves. Inasmuch as a value is desired between available samples, interpolation may be used to obtain the desired value.

Thus, the seismic data may be provided as a series of data traces, each trace being associated with a seismic energy detector having a specified location. The traces may be provided as ordered pairs of time (or depth) and attribute value. If the trace samples are equally spaced, the time (or depth) portion may be dropped and the data provided as a sequence of attribute values. In the ensuing discussion, the attribute value is assumed to be a measurement of reflectivity. However, the attribute value may represent any suitable characteristic derived from the seismic energy measurements of the detectors.

Figure 6:
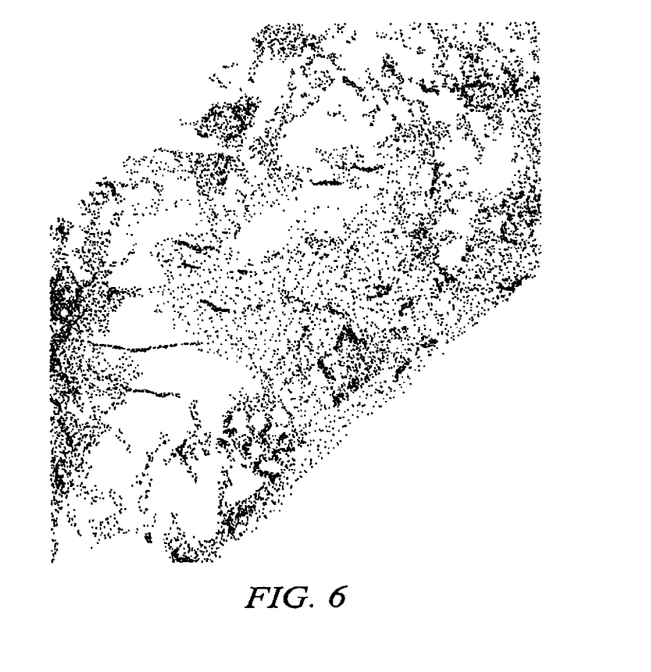
FIG. 6 shows an example of a map showing discontinuities in seismic data.

FIG. 6 shows an example of a two-dimensional map showing discontinuity measurements at a constant depth. The light areas represent areas with low discontinuity measurements, and the dark areas represent areas with high discontinuity measurements. Various fault zones appear clearly on the map. The procedures disclosed herein allow system 206 to generate such a map from seismic data sets having the form shown in FIGS. 4 and 5, and allow system 206 to provide such a map to a user via display 302. These procedures may also be used to generate discontinuity measurements at each point in a volume, and to show discontinuity measurements in a vertical cross-section.

The discontinuity measurement procedures disclosed herein calculate discontinuity measurements based on seismic data contained in groups of two or more traces. The groups may be determined using a detector window, e.g., detector window 402 in FIG. 4. A detector window is hereby defined to be a closed contour on the detector arrangement. In certain procedure embodiments, the detector window is systematically moved from position to position until each detector has been included in the window at least once. Discontinuity measurement calculations may be performed for each detector window position.

Figure 7:
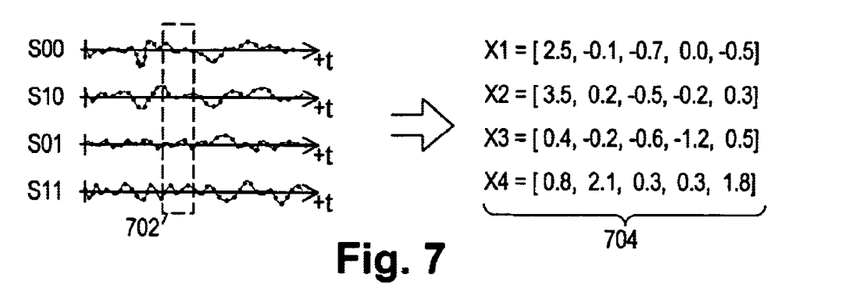
FIG. 7 shows an example of a data window, and the trace vectors that correspond to the data window.

FIG. 7 shows the group of traces associated with the detectors in window 402. A time or depth window 702 may be used to select a portion of each trace in the group. As with the detector window, the time or depth window 702 may be systematically moved from position to position until each portion of the traces has been included in the window at least once. Discontinuity measurement calculations may be made for each combination of positions for the detector window and time/depth window. The detector window and time/depth window, in combination, define a data window or "trace window". The trace window selects a small portion of the seismic data set for a calculation of discontinuity measurement, and the calculation may be repeated for each position (or alternatively, for selected positions) of the trace window.

The data contained within a trace window may be expressed in terms of a set of vectors 704. Each vector corresponds to the selected portion of a trace contained within the trace window. The vectors may be labeled $x_i$ with the index i chosen solely for convenience. The index does not necessarily carry any meaning with regards to position of the detectors associated with the traces from which the vectors are derived. In the following paragraphs, the jth element of the ith vector is represented as $x_{ij}$.

Figures 8, 9:
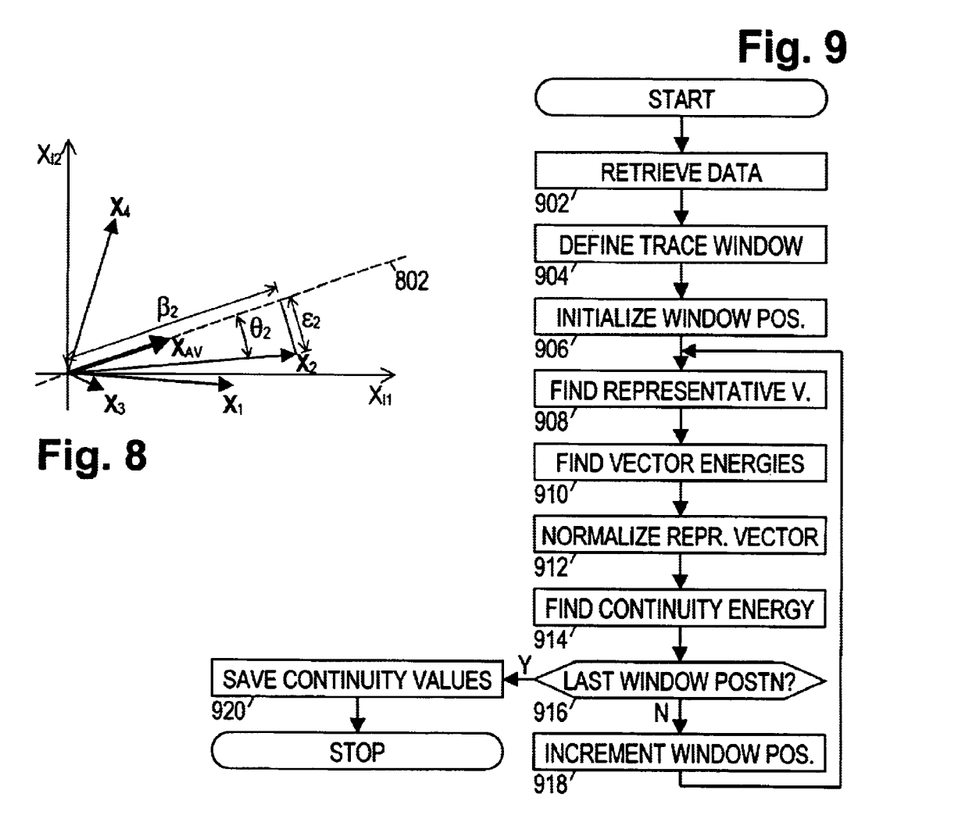
FIG. 8 shows a graphical representation of the trace vectors of FIG. 7, along with information extracted therefrom.
FIG. 9 shows a flowchart illustrative of various exemplary embodiments of the present invention.

Each of the elements $x_{ij}$ of a vector i can be thought of as a spatial coordinate in multidimensional space. For simplicity, FIG. 8 shows a two-dimensional graphical representation of the vector set 704, in which the vectors are shown in terms of their first two elements $x_{i1}$ and $x_{i2}$. Though the following explanation is illustrated in two dimensions, it nevertheless holds true when extended to a higher-dimensional space.

When viewed in terms of a vector representation, the measurement of discontinuity may be expressed as a measure of the vector dispersion. Stated another way, the measurement of discontinuity may represent the deviations of vectors in a set from a common point or line. The discontinuity measurement may be calculated in various ways, a number of which are expressly laid out below.

A first discontinuity calculation method is herein referred to as the "line of similarity method". In this method, the energy of the vectors is divided into fractional portions. One fraction measures the alignment of the set of vectors, and the other fraction measures the dispersion of the set of vectors. This latter fraction may be taken as a measurement of discontinuity.

An average vector $x_{AV}$ may be found by adding the vectors $x_i$ together and dividing by the number of vectors. The average vector $x_{AV}$ may be taken as a representative of the vector set. The representative vector $x_{AV}$ defines a line 802, herein referred to as "the line of similarity". The commonality (and hence continuity/discontinuity) of the vector set 704 may be measured with respect to this line.

Each of the vectors $x_i$ has a component $\beta_i$ parallel to the line of similarity, and a component $\epsilon_i$ perpendicular to the line of similarity. Each of these component measurements may be termed a projection value, since they respectively represent the projection of the vector $x_i$ onto the line of similarity and orthogonal to the line of similarity. FIG. 8 specifically shows these projection values for vector $x_2$. The projection values can be calculated as follows:

$$\beta_i = \frac{x_i \cdot x_{AV}}{|x_{AV}|} \tag{1}$$

$$\epsilon_i = \sqrt{|x_i|^2 - \beta_i^2} \tag{2}$$

where "·" represents the inner-product ("dot product") of two vectors, and the vertical lines denote a vector magnitude. For those unfamiliar with dot products, the dot product is calculated $$x_i \cdot x_k = \sum_{j=1}^{M} x_{ij} x_{kj},$$

where M is the number of trace samples in each vector.

Each vector's energy $\underline{E}_i$ can be expressed in each of the following ways:

$$E_i = |x_i|^2 \tag{3}$$

$$E_i = \epsilon_i^2 + \beta_i^2 \tag{4}$$

The total energy of all the vectors can be expressed by performing a summation on each of the terms in equation (4), as follows:

$$\sum_i E_i = \sum_i \epsilon_i^2 + \sum_i \beta_i^2 \tag{5}$$

Dividing both sides by the total energy produces the following expression:

$$1 = \frac{\sum_i \epsilon_i^2}{\sum_i E_i} + \frac{\sum_i \beta_i^2}{\sum_i E_i} \tag{6}$$

The first term on the right side of equation (6) represents the fraction of vector energy devoted to dispersion of the vector set, while the last term on the right side represents the fraction devoted to alignment of the vector set. In the line of similarity method, the dispersion term is the measure of discontinuity D. Because of the inverse relationship between the dispersion and alignment terms, the alignment term may be taken as a measure of continuity C.

$$C = \frac{\sum_i \beta_i^2}{\sum_i E_i} \tag{7}$$

$$D = \frac{\sum_i \varepsilon_i^2}{\sum_i E_i} = 1 - C \qquad (8)$$

For computational ease, it may be more convenient to first calculate continuity C, and then to determine the discontinuity measurement using the-rightmost side of equation (8).

In a variation of the line of similarity method, a continuity value $C_i$ and a discontinuity value $D_i$ are calculated for each vector in the vector set, then the continuity value C (or discontinuity value D) of the vector set may be calculated by taking the average of the individual continuity values $C_i$ (or discontinuity values $D_i$). Referring back to equations (1) and (4), the individual continuity and discontinuity values may be measured as follows:

$$C_i = \frac{\beta_i^2}{E_i} = \left[\frac{x_i \cdot x_{AV}}{|x_i||x_{AV}|}\right]^2 \qquad (9)$$

$$D_i = \frac{\varepsilon_i^2}{E_i} = 1 - C_i \qquad (10)$$

The discontinuity measurement D produced by this variation is expressed below:

$$D = \frac{1}{N}\sum_{i=1}^{N} D_i, \qquad (11)$$

where N is the number of vectors in the vector set. This discontinuity measurement is related to the discontinuity measurement provided by the line of similarity method, but the measurement value is not the same. The individual continuity values $C_i$ measure $\cos^2\theta_i$, where $\theta_i$ is the angle between vector i and the vector average. FIG. 8 shows this angle for vector $x_2$. Conversely, the individual discontinuity values $D_i$ measure $\sin^2\theta_i$.

In the discontinuity measurement methods described above, vectors in a vector set are compared to a representative vector $x_{AV}$. Other vectors may be chosen as alternative representatives of the vector set. For example, the representative vector may be chosen to be any one of the vectors that minimizes the Manhattan distance (the sum of absolute differences between the representative vector and each of the vectors in the set), or higher-power distances (the sum of absolute differences to the power between the representative vector and each of the vectors in the set). Another alternative is to use a unit vector that is derived by averaging directions of the vectors in the vector set. Still another alternative is to select one of the vectors in the vector set as the representative vector. This selection could be a median vector, could be based on trace position, or could be made based on some other criterion. Yet another alternative is to perform a weighted sum of the vectors in the vector set. As an example, the summation weights could be associated with trace position.

Still yet another alternative is to determine a representative vector using a neural network. For example a single-neuron network that employs a Hebbian-learning rule may be trained on the vector set to identify a representative vector. In summary, an application of a data vector $x_i$ to the neuron causes the data vector $x_i$ to be multiplied by a weight vector w (using the dot product) to obtain an output value y. As each vector is applied to the neuron, the weight vector is updated in accordance with Hebb's rule ($w_{new} = w_{old} + \eta y x_i$) or some variation thereof. The data vectors may be applied in a random order and the process repeated any number of times that is empirically determined to be suitable. The resulting weight vector w may be used as the representative vector for the data set. Further details on neural networks and Hebbian learning may be found in *Neural and Adaptive Systems: Fundamentals through Simulation* by J. C. Principe, N. R. Euliano and W. C. Lefebvre, ©2000 by John Wiley & Sons, Inc., New York. Chapter 6 of this book is hereby incorporated by reference herein.

FIG. 9 shows a flowchart that is illustrative of a discontinuity measurement procedure that may be carried out by system 206. While it is expected that the procedure will be implemented in the form of software, it is also contemplated that application-specific hardware implementations may be used. The form of the flowchart is chosen to aid understanding of the methods disclosed herein. It should be recognized, however, that the actual implementation may differ markedly due to the use of concurrent operations, multiple threads, and object oriented programs. Even where the method is implemented using discrete, sequential steps, these steps may be implemented in a different order than that shown without departing from the scope of the claims.

Beginning in block 902, system 206 retrieves at least some of the seismic data set for processing. In block 904, the system determines the size of the trace window to be used in calculating discontinuity measurements. This determination may be based on a default rule or stored parameter, or alternatively may be specified by an operator in response to a query from system 206. The trace window may be expressed in terms of a pattern of traces to be used around a given trace and in terms of a width for a time or depth window. At this time, the system 206 may further determine limits on the data to be processed, e.g., the size of the data set, or operator-specified limits on x, y and z or t axes. Other limits may be specified including horizons or other 3D contours in the data set.

Having determined a trace window and any limits on discontinuity measurement calculations (if applicable), system 206 determines an initial trace window position in block 906. In block 908, system 206 identifies the data to be processed in terms of vectors, potentially performing interpolation or resampling if needed. In block 908, system 206 also determines a representative vector, preferably using one of the averaging, minimum distance, or neural network techniques described previously.

In block 910, system 206 calculates the energy of the data vectors and the representative vector. In block 912, system 206 may normalize the representative vector to simplify subsequent calculations. In block 914, system 206 may calculate the continuity or discontinuity measurement of the vector set in accordance with previously disclosed techniques.

In block 916, system 206 determines whether the discontinuity measurement has been performed for the last trace window position. If not, then in block 918 system 206 increments the trace window position and returns to block 908 to perform the next discontinuity measurement calculation. Otherwise, in block 920 system 206 stores the calculated continuity or discontinuity measurements. System 206 may further display the calculated measurements to an operator, possibly in the map format shown in FIG. 6.

In the foregoing discussion, various continuity/discontinuity measurement methods have been described in the context of seismic data interpretation. However, the described methods may be beneficial for application in any multidimensional data set. The described methods may prove useful in contexts such as medical imaging, analyzing stock trends, quality control, and construction maintenance. For example, in the specific context of construction maintenance, data from radar or acoustic energy reflections can be gathered from buildings, bridges, airfields, dams or other large constructions, and the described methods may be advantageously applied for detecting cracks or other flaws.

Numerous variations and modifications will become apparent to those skilled in the art once the above disclosure is fully appreciated. For example, the seismic data may be presented in any form suitable for representing information regarding an area or volume of the earth. It is intended that the following claims be interpreted to embrace all such variations and modifications.

What is claimed is:

1. A method of measuring continuity of a data set, the method comprising:
    obtaining a vector set from the data set;
    combining vectors from the vector set to determine a representative vector for the vector set; and
    calculating a continuity measurement for the vector set, wherein the continuity measurement is expressible as:

$$C = \frac{\sum_i \beta_i^2}{\sum_i E_i},$$

wherein C represents the continuity measurement, $\beta_i$ represents the projection value for vector i, $E_i$ represents an energy of vector i, and i represents an index that ranges over the vector set.

2. A method of measuring continuity of a data set, the method comprising:
    obtaining a vector set from the data set;
    combining vectors from the vector set to determine a representative vector for the vector set; and calculating a continuity measurement for the vector set, wherein the continuity measurement is expressible as:

$$C = \frac{1}{N} \sum_{i=1}^{N} \frac{\beta_i^2}{E_i},$$

wherein C represents the continuity measurement, $\beta_i$ represents the projection value for vector i, $E_i$ represents an energy of vector i, i represents an index that ranges over the vector set, and N represents a number of vectors in the vector set.

3. The method of claim 2, wherein said combining vectors from the vector set to determine a representative vector for the vector set includes:
    summing the vectors in the vector set.

4. The method of claim 3, wherein said combining vectors from the vector set to determine a representative vector from the vector set further includes:
    dividing a sum of the vectors in the vector set to obtain an average vector.

5. The method of claim 2, wherein said combining vectors from the vector set to determine a representative vector for the vector set includes:
    determining a weighted sum of the vectors in the vector set.

6. A method of measuring continuity of a data set, the method comprising:
    obtaining a vector set from the data set;
    combining vectors from the vector set to determine a representative vector for the vector set, wherein said combining vectors includes determining the representative vector to be that vector that minimizes a total distance measurement between the representative vector and each of the vectors in the vector set, wherein the total distance measurement combines Manhattan distance measurements from the representative vector to each of the vectors in the vector set; and
    calculating a continuity measurement for the vector set.

7. A method of measuring continuity of a data set, the method comprising:
    obtaining a vector set from the data set;
    combining vectors from the vector set to determine a representative vector for the vector set, wherein said combining vectors includes training a neural network on the vector set; and
    calculating a continuity measurement for the vector set.

8. The method of claim 7, wherein the neural network is a single-neuron network that iteratively updates a weight vector using a Hebbian-learning rule.

9. A method of measuring discontinuity of a data set, the method comprising:
    obtaining a vector set from the data set;
    combining vectors from the vector set to determine a representative vector for the vector set; and
    calculating a discontinuity measurement for the vector set, wherein the discontinuity measurement is expressible as:

$$D = \frac{\sum_i \varepsilon_i^2}{\sum_i E_i},$$

wherein D represents the discontinuity measurement, $\varepsilon_i$ represents the projection value for vector i, $E_i$ represents an energy of vector i, and i represents an index that ranges over the vector set.

10. A method of measuring discontinuity of a data set, the method comprising:
    obtaining a vector set from the data set;
    combining vectors from the vector set to determine a representative vector for the vector set; and
    calculating a discontinuity measurement for the vector set, wherein the discontinuity measurement is expressible as:

$$D = \frac{1}{N} \sum_{i=1}^{N} \frac{\varepsilon_i^2}{E_i},$$

wherein D represents the discontinuity measurement, $\varepsilon_i$ represents the projection value for vector i, $E_i$ represents an energy of vector i, i represents an index that ranges over the vector set, and N represents a number of vectors in the vector set.

11. The method of claim 10, wherein said combining vectors from the vector set to determine a representative vector for the vector set includes:
    summing the vectors in the vector set.

12. The method of claim 11, wherein said combining vectors from the vector set to determine a representative vector from the vector set further includes:

dividing a sum of the vectors in the vector set to obtain an average vector.

13. The method of claim 10, wherein said combining vectors from the vector set to determine a representative vector for the vector set includes:

determining a weighted sum of the vectors in the vector set.

14. A method of measuring discontinuity of a data set, the method comprising:

obtaining a vector set from the data set;

combining vectors from the vector set to determine a representative vector for the vector set, wherein said combining vectors includes determining the representative vector to be that vector that minimizes a total distance measurement between the representative vector and each of the vectors in the vector set, wherein the total distance measurement combines Manhattan distance measurements from the representative vector to each of the vectors in the vector set; and calculating a discontinuity measurement for the vector set.

15. A method of measuring discontinuity of a data set, the method comprising:

obtaining a vector set from the data set;

combining vectors from the vector set to determine a representative vector for the vector set, wherein said combining vectors includes training a neural network on the vector set; and calculating a discontinuity measurement for the vector set.

16. The method of claim 15, wherein the neural network is a single-neuron network that iteratively updates a weight vector using a Hebbian-learning rule.

17. A method of seismic exploration that comprises:

detecting seismic energy with an array of detectors;

converting detection signals from the array of detectors into data representing one or more attributes as a function of position for subsurface formations;

systematically obtaining subsets of the data as vector sets; and for each vector set:

combining vectors from the vector set to determine a representative vector for the vector set, wherein said combining vectors includes determining the representative vector to be that vector that minimizes a total distance measurement between the representative vector and each of the vectors in the vector set, wherein the total distance measurement combines Manhattan distance measurements from the representative vector to each of the vectors in the vector set; and calculating a continuity or discontinuity measurement with respect to the representative vector.

18. A method of seismic exploration that comprises:

detecting seismic energy with an array of detectors;

converting detection signals from the array of detectors into data representing one or more attributes as a function of position for subsurface formations;

systematically obtaining subsets of the data as vector sets; and for each vector set:

combining vectors from the vector set to determine a representative vector for the vector set, wherein said combining vectors includes training a neural network on the vector set; and calculating a continuity or discontinuity measurement with respect to the representative vector.

19. The method of claim 18, wherein the neural network is a single-neuron network that iteratively updates a weight vector using a Hebbian-learning rule.

20. A seismic survey system comprising:

a data storage device that stores seismic measurements; and a processor that retrieves said seismic measurements as one or more vector sets and combines vectors from at least one of the vector sets to determine a representative vector, wherein said processor calculates a continuity or discontinuity measurement with respect to the representative vector, and wherein the processor combines vectors to determine the representative vector by training a neural network on said at least one of the vector sets.

21. The system of claim 20, wherein the neural network is a single-neuron network that iteratively updates a weight vector using a Hebbian-learning rule.

* * * * *